US010210698B2

(12) United States Patent
Sumi et al.

(10) Patent No.: US 10,210,698 B2
(45) Date of Patent: Feb. 19, 2019

(54) GAME MACHINE PUSHBUTTON

(71) Applicant: OMRON Corporation, Kyoto-shi, Kyoto (JP)

(72) Inventors: Masaaki Sumi, Gifu (JP); Hiroyuki Onitsuka, Kani (JP); Takehiro Agata, Ichinomiya (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/678,208

(22) Filed: Aug. 16, 2017

(65) Prior Publication Data

US 2018/0075691 A1 Mar. 15, 2018

(30) Foreign Application Priority Data

Sep. 15, 2016 (JP) ................................ 2016-180096

(51) Int. Cl.
*A63F 9/24* (2006.01)
*A63F 13/00* (2014.01)
*G06F 17/00* (2006.01)
*G06F 19/00* (2018.01)
*G07F 17/32* (2006.01)

(52) U.S. Cl.
CPC ...... *G07F 17/3209* (2013.01); *G07F 17/3213* (2013.01)

(58) Field of Classification Search
CPC ......................... G07F 17/3209; G07F 17/3213
See application file for complete search history.

(56) References Cited

U.S. PATENT DOCUMENTS

2004/0256210 A1* 12/2004 Morita .................. H01H 3/122
200/344
2005/0085292 A1 4/2005 Inamura
2014/0179429 A1 6/2014 Okazaki et al.

FOREIGN PATENT DOCUMENTS

JP 2005-111137 A 4/2005
JP 5866825 B2 2/2016

* cited by examiner

*Primary Examiner* — Kevin Y Kim
(74) *Attorney, Agent, or Firm* — Metrolexis Law Group, PLLC

(57) ABSTRACT

A pushbutton includes a key top, including a light-transmissive display part, the key top configured to be depressed; and LEDs configured to emit light toward the display part. The display part includes a bottom surface and a sloped surface, the sloped surface being continuous with an outer edge of the bottom surface and broadening outward as the sloped surface progresses upward from the bottom surface. The light emitted from the LEDs toward the display part is reflected by the sloped surface and emitted toward the exterior from a top surface.

6 Claims, 6 Drawing Sheets

GAME MACHINE PUSHBUTTON

CROSS-REFERENCES TO RELATED APPLICATIONS

This application claims priority to Japanese Patent Application No. 2016-180096 filed Sep. 15, 2016, the entire contents of which are incorporated herein by reference.

FIELD

The disclosure relates to a game machine pushbutton installed in a game machine.

BACKGROUND

In a slot machine, which is one type of a game machine, a plurality of different types of symbols are provided on each of a plurality of reels. The reels rotate, and when the reels are stopped, the symbols showing through a window and the order in which those symbols are aligned determine a combination. An award is provided on the basis of the combination determined in this manner and a betting number. The reels begin to rotate when a pushbutton or a lever provided in the slot machine to start the rotation is manipulated. In slot machines installed in a casino or the like, the reels are automatically stopped under the control of the machine.

Rather than having slot machines manufactured by only one game machine manufacturer, gaming facilities such as casinos have slot machines manufactured by a variety of game machine manufacturers. Players select a preferred slot machine out of the machines from the various game machine manufacturers and play the selected machine. A gaming facility will therefore install slot machines popular with players to gain an advantage over other competing gaming facilities. In response, game machine manufacturers continue to develop slot machines that appeal to players.

For example, JP 2005-111137A discloses a slot machine provided with a display unit constituted of a touch panel, where characters, a numerical keypad, and the like are displayed in the display unit and the touch panel can be used to set a betting number, start the rotation of the reels, and so on.

JP 2005-111137A (published Apr. 28, 2005) and Japanese Patent No. 5866825 (registered Jan. 15, 2016) are examples of background art.

However, with the slot machine disclosed in JP 2005-111137A, a player must check the screen to see whether or not a betting number has been set through a touch operation each time s/he sets a betting number. As a result, the operating sensation is poorer than a traditional pushbutton system, and cannot provide an intuitive operating sensation (a clicking sensation, for example). Furthermore, having the player check the screen each time s/he sets a betting number is problematic in that more time is required for a single game, which reduces a sense of speed and quickness.

In light of such issues, the applicants for the present invention invented a switch unit in which an operating button is arranged over a display unit, with an elastic material interposed therebetween, such that images from the display unit are visible through the operating button. A lens that makes images from the display unit appear to be displayed on the operating surfaces of keys is furthermore arranged between the display unit and the operating button (see Japanese Patent No. 5866825).

According to one or more aspects, not only can various displays be made in the display unit, but an intuitive operating sensation of keys being depressed can also be achieved. Furthermore, achieving this intuitive operating sensation makes it unnecessary to check the screen for the details set with each operation, which makes it possible to achieve a similar sense of speed and quickness as provided by a pushbutton system. Further still, images from the display unit, which is behind the keys, appear to be displayed on the operating surfaces of the keys, such that the operating surfaces sensed visually match the operating surfaces sensed by touch. This makes operations with sensations similar to those of a pushbutton possible.

Incidentally, in the case where an operating button is a light-transmissive member, images in an input region displayed in the display unit are reflected by side surface walls of the three-dimensional operating button, and these reflections are visible to the player. This is problematic in that the player will sense a distance between the image and a first member (a sense of depth in the image).

In response to this, in the switch unit according to Japanese Patent No. 5866825, the side surface walls of the operating button are sloped surfaces that broaden outward as the walls progress downward, with the sloped surfaces arranged on the far side with respect to the player, such that light reflected by the side surface walls is not visible to the player. This reduces the sense of depth in the images for the player.

The one or more aspects provide a game machine pushbutton that reduces a sense of depth in an image for a player using a different technique from that disclosed in Japanese Patent No. 5866825, and enhances an aesthetic effect.

SUMMARY

To solve the above-described problems, a game machine pushbutton installed in a game machine according to one or more aspects includes: an operating key, including a light-transmissive first member, the operating key configured to be depressed; and a light-emitting unit configured to emit light toward the first member. The first member includes a bottom surface and a sloped surface, the sloped surface being continuous with an outer edge of the bottom surface and broadening outward as the sloped surface progresses upward from the bottom surface. The light emitted from the light-emitting unit toward the first member is reflected by the sloped surface and emitted toward the exterior from a top surface opposing the bottom surface.

According to one or more aspects, the operating key is light-transmissive, and thus a player can view an image displayed below the operating key.

Meanwhile, in the case where the first member does not have the sloped surface, the player will be able to see the image reflected by the side surface of the first member. There is thus a problem in that a sense of distance between the image and the first member will be felt by the player, or in other words, the image will have a sense of depth. However, by the first member having he sloped surface, a situation in which the image is reflected by the side surface can be suppressed, which makes it possible to reduce a sense of depth in the image for the player.

Furthermore, the light emitted from the light-emitting unit toward the first member is reflected by the sloped surface and emitted to the exterior from the top surface of the first member, and thus the outer edge of the first member can be illuminated. The aesthetic effect can be enhanced as a result. Furthermore, illuminating the outer edge of the first member makes it possible to display the image sharply. This makes it possible to further suppress a situation in which the player feels a sense of distance between the image and the first member, and further reduce a sense of the depth in the image on the part of the player.

In the game machine pushbutton according to one or more aspects, it is preferable that the first member include a side surface continuous with the sloped surface, and the light emitted from the light-emitting unit enter the first member from the side surface.

According to this aspect, the light emitted from the light-emitting unit enters the first member from the side surface of the first member, and thus the percentage of light fully reflected by the bottom surface and the top surface can be increased. As a result, a situation in which light escapes from locations aside from the outer edge of the first member can be suppressed.

In the game machine pushbutton according to one or more aspects, it is preferable that the operating key include a second member configured to make contact with the side surface and guide light, and that the light emitted from the light-emitting unit enter the first member from the side surface via the second member.

According to this aspect, the light emitted from the light-emitting unit is guided by the second member and enters the first member from the side surface of the first member. The directions in which the light enters the first member can therefore be narrowed down. As a result, the percentage of the light fully reflected by the bottom surface and the top surface can be further increased, which makes it possible to further suppress a situation in which light escapes from locations aside from the outer edge of the first member.

In the game machine pushbutton according to one or more aspects, it is preferable that the pushbutton further include a protective member configured to protect a side surface of the game machine pushbutton. Additionally, it is preferable that the light-emitting unit emit light toward the protective member; that the protective member be configured to allow some of the light emitted from the light-emitting unit to pass and reflect some of the emitted light; and that some of the light reflected by the protective member enter the second member, be guided by the second member, and enter the first member.

According to this aspect, the protective member can be illuminated by the light passing through the protective member, which makes it possible to enhance the aesthetic effect. Furthermore, the outer edge of the first member and the protective member can be illuminated by the same light-emitting unit.

In the game machine pushbutton according to one or more aspects, it is preferable that the protective member be configured to disperse the emitted light.

According to this aspect, the protective member disperses the light emitted into the protective member, and thus the entire protective member can be illuminated, and some of the reflected light can be caused to enter the second member.

One or more aspects may reduce a sense of depth in an image on the part of a player and enhancing an aesthetic effect.

DETAILED DESCRIPTION

Embodiments will be described in detail hereinafter.

A pushbutton 1 according to one or more embodiments will be described with reference to FIGS. 1 to 8. The pushbutton 1 is a game machine pushbutton installed in a game machine such as a slot machine.

Configuration of Pushbutton 1

The configuration of the pushbutton 1 will be described with reference to FIGS. 1 to 6.

Figure 1:
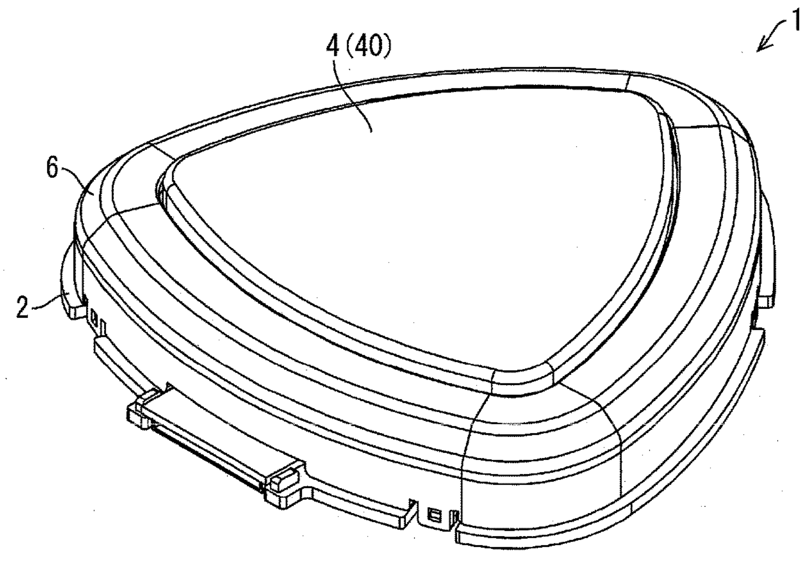
FIG. 1 is a perspective view of an outer appearance of a pushbutton according to one or more embodiments.
Figure 2:
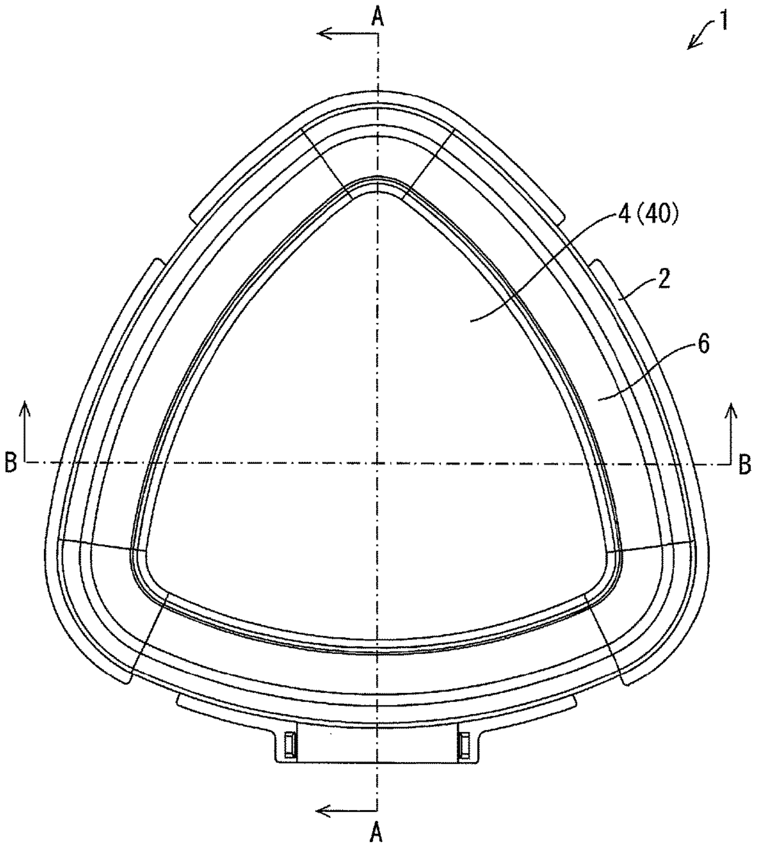
FIG. 2 is a plan view of a pushbutton.
Figure 3:
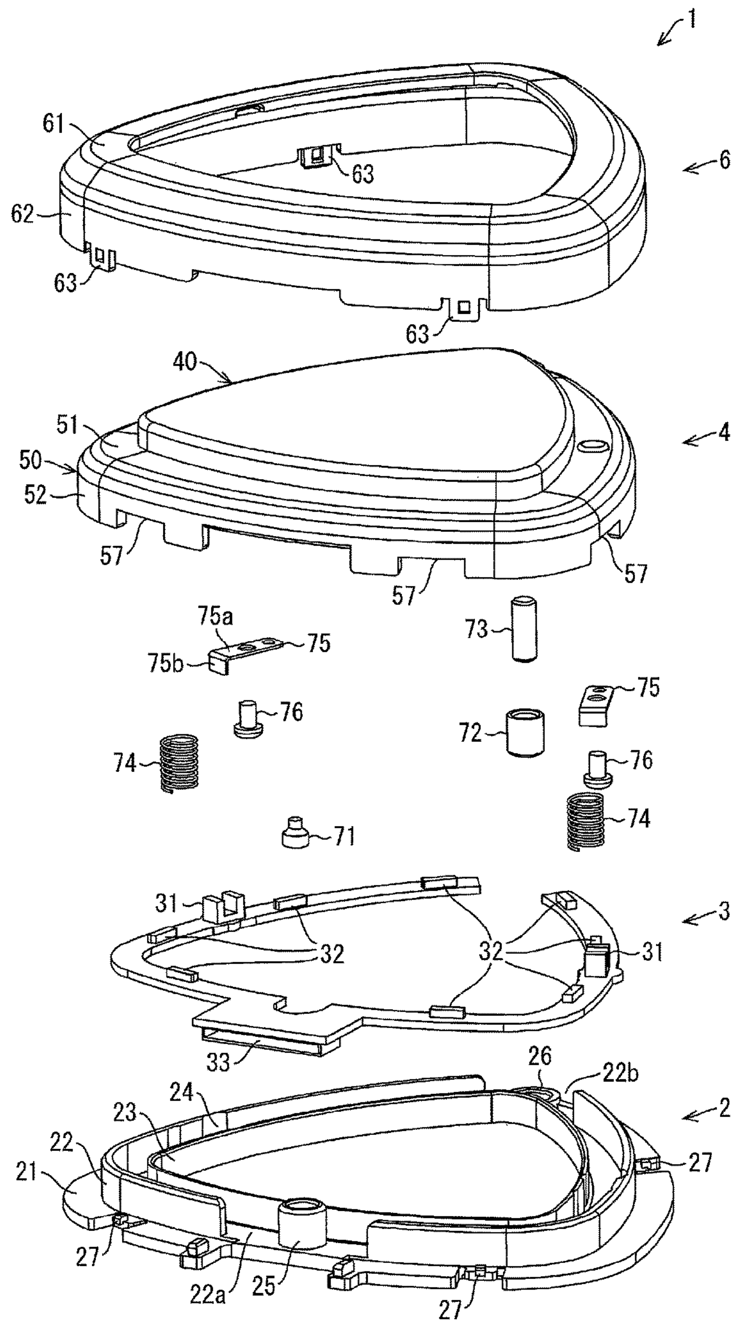
FIG. 3 is an exploded perspective view of a pushbutton.
Figure 4:
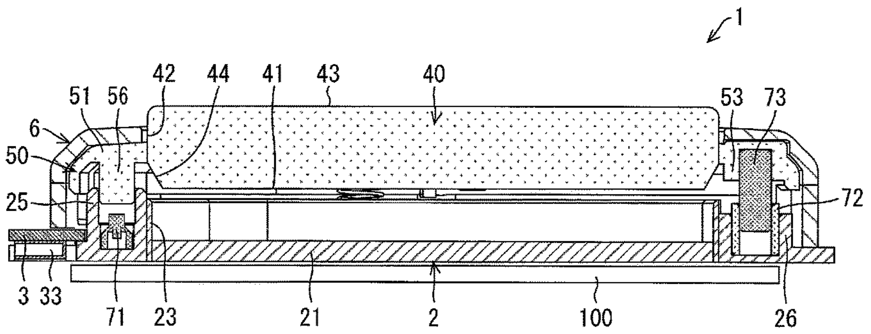
FIG. 4 is a cross-sectional view seen from an A-A arrow in FIG. 2, illustrating the configuration of the pushbutton.
Figure 5:
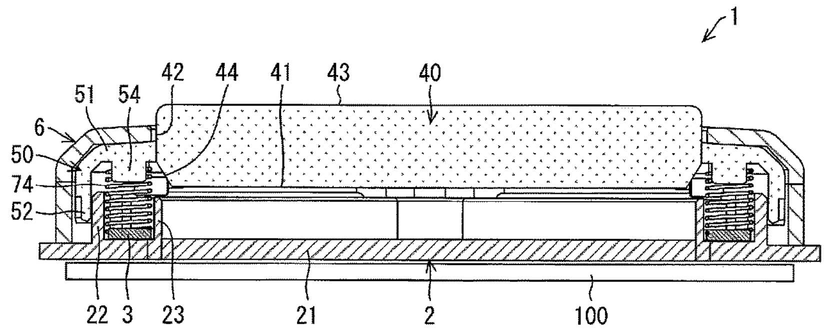
FIG. 5 is a cross-sectional view seen from a B-B arrow in FIG. 2, illustrating the configuration of the pushbutton.

FIG. 1 is a perspective view of the outer appearance of the pushbutton 1. FIG. 2 is a plan view of the pushbutton 1. FIG. 3 is an exploded perspective view of the pushbutton 1. FIG. 4 is a cross-sectional view seen from an A-A arrow in FIG. 2, illustrating the configuration of the pushbutton 1. FIG. 5 is a cross-sectional view seen from a B-B arrow in FIG. 2, illustrating the configuration of the pushbutton 1. In the following descriptions, the upward direction in FIG. 2 is assumed to represent a rearward direction, and the downward direction in FIG. 2 is assumed to represent a forward direction.

As illustrated in FIG. 2, the pushbutton 1 is substantially triangular when viewed in plan view from above. However, the pushbutton according to one or more embodiments is not limited to being substantially triangular when viewed in plan view from above. The shape of the pushbutton may be another polygon such as a quadrangle, a circle, or the like when viewed in plan view from above.

As illustrated in FIGS. 1 to 3, the pushbutton 1 includes a base 2, a printed circuit board (PCB; a board) 3, a key top 4, and a bezel 6.

The base 2 is a member that supports the PCB 3, the key top 4, and the bezel 6, and is light-transmissive. As illustrated in FIG. 3, the base 2 includes a substantially triangular flat plate 21, and an outer wall 22 and an inner wall 23 formed projecting upward from a top surface of the flat plate 21. Like the flat plate 21, the outer wall 22 and the inner wall 23 are substantially triangular. A groove 24 is formed between the outer wall 22 and the inner wall 23.

An opening 22*a* is formed in a central part of a front side of the outer wall 22. A hollow cylindrical member 25 that projects upward from the flat plate 21 is formed in the location where the opening 22*a* is formed. Rubber 71 is provided within the cylindrical member 25.

An opening 22*b* is formed in a rear side of the outer wall 22. A hollow cylindrical member 26 that projects upward from the flat plate 21 is formed in the location where the opening 22*b* is formed. A bushing 72 is inserted into the cylindrical member 26. Four locking parts 27 for attaching the bezel 6 (described later) are formed in an outer edge of the flat plate 21.

The PCB 3 is a board on which sensors 31 and light-emitting diodes (LEDs) 32 serving as light emitting units are mounted. The sensor 31 and the LEDs 32 are electrically connected to the PCB 3. The PCB 3 has a substantially triangular frame shape so that the majority of the PCB 3 fits into the groove 24 in the base 2, and part of the triangle of the PCB 3 projects forward. A connector 33 for connecting the pushbutton 1 to a controller (not illustrated) is provided on a bottom side of the projecting part.

The sensors 31 are sensors for detecting that the key top 4 has been depressed by a player, and is a photosensor in the present embodiment. Two of the sensors 31 are provided on an upper part of the PCB 3. The sensors 31 have substantially square U shapes with openings on the upper sides thereof. A method by which the sensors 31 detect the key top 4 being depressed will be described later. A detection result from the sensors 31 is outputted to the controller of the pushbutton 1 via the PCB 3.

The LEDs 32 are light-emitting units for illuminating a side-surface cover member 62 of the bezel 6 (described later) and a display part 40 of the key top 4. Eight of the LEDs 32 are provided at substantially equal intervals on a top part of the PCB 3. The emission of light by the LEDs 32 will be described in detail later.

The key top 4 is an operating key for receiving an operation (being depressed) by a player. The structure of the key top 4 will be described with reference to FIGS. 3 to 6.

Figure 6:
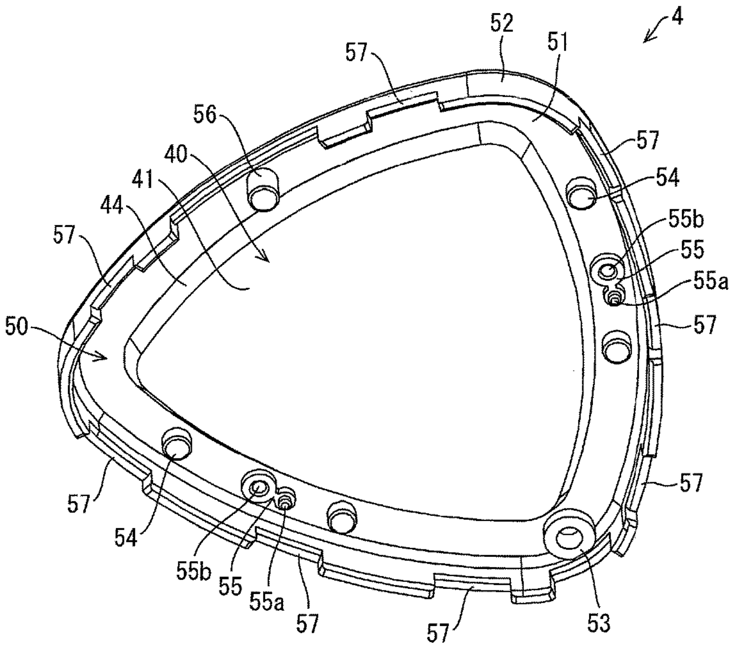
FIG. 6 is a perspective view taken from below a key top included in a pushbutton.

FIG. 6 is a perspective view of the key top 4, taken from below.

As illustrated in FIGS. 3 to 6, the key top 4 includes the display part (a first member) 40 and a light guide part (a second member) 50.

As illustrated in FIGS. 4 and 5, the display part 40 is constituted of a bottom surface 41, a side surface 42, a top surface 43, and a sloped surface 44 that connects the bottom surface 41 to the side surface 42 and broadens outward as the sloped surface 44 progresses upward. When viewed in plan view from above, the shape of the display part 40 is substantially the same as the shape of a region enclosed by the inner wall 23 of the base 2. The display part 40 is light-transmissive. In the pushbutton 1, the base 2 and the display part 40 are light-transmissive, and thus in the case where a liquid crystal display (LCD) 100 is arranged below the base 2 as illustrated in FIGS. 4 and 5, the player can see images displayed in the LCD 100. Note that the LCD 100 displays display information such as text and graphics in a region opposite the key top 4.

The light guide part 50 is a member for guiding some of the light emitted from the LEDs 32 to the display part 40. The light guide part 50 is provided in the periphery of the display part 40, and includes a top wall 51 and a side wall 52. As illustrated in FIGS. 4 and 5, the light guide part 50 has a substantially L-shaped cross-sectional shape when cut perpendicular to the horizontal direction. An end part on the top wall 51 side makes contact with the side surface 42 of the display part 40, and an end part on the side wall 52 side is separated from the base 2 by a predetermined distance while the key top 4 is not being depressed by the player (at least a distance by which the key top 4 is depressed by the player). As illustrated in FIG. 6, a shaft bearing part 53, two first projecting parts 54, two plate attachment parts 55, and a second projecting part 56 are provided on a bottom surface of the top wall 51.

The shaft bearing part 53 is a cylindrical member, provided in a position opposite the cylindrical member 26 of the base 2, having a central part that opens downward. As illustrated in FIG. 4, a shaft 73 is inserted into the shaft bearing part 53. A bottom end of the shaft 73 is separated from the base 2 by a predetermined distance while the key top 4 is not being depressed by the player (at least a distance by which the key top 4 is depressed by the player), and is inserted into the bushing 72 that is inserted into the cylindrical member 26. By inserting the shaft 73 into the shaft bearing part 53 and the bushing 72 in this manner, the key top 4 is limited to movement in the up-down direction when the player depresses the key top 4.

The first projecting parts 54 are members projecting downward from the bottom surface of the top wall 51. One of the first projecting parts 54 is provided on each of the two sides of the triangle formed by the light guide part 50 excluding the front side. Springs 74 are fitted onto the first projecting parts 54, with top ends of the springs 74 making contact with the top wall 51 and bottom ends of the springs 74 making contact with the PCB 3. The springs 74 bias the key top 4 upward such that the key top 4 remains pushed upward while the key top 4 is not being depressed by the player.

The plate attachment parts 55 are members to which plates 75 through which the sensors 31 detect that the key top 4 has been depressed are attached. One each of the plate attachment parts 55 is provided on the sides of the triangle formed by the light guide part 50 excluding the front side. Each of the plates 75 includes a base part **75*a* attached to the corresponding plate attachment part 55 and a bent part 75*b* formed by bending an end part of the base part 75*a*. Each of the plate attachment parts 55 includes a protruding part 55*a* inserted into a hole provided in the corresponding base part 75*a* for positioning the corresponding plate 75 relative to the light guide part 50, and a hole 55*b* into which is inserted a screw 76 for attaching the corresponding plate 75 to the light guide part 50**.

Operations of the pushbutton 1 when the key top 4 is depressed by the player will be described next. When the key top 4 is depressed by the player, first, the key top 4 moves downward against the biasing force of the springs 74. The plates 75 move downward as a result, and the bent parts **75*b* of the plates 75 move into the openings of the corresponding sensors 31. By detecting the bent parts 75*b*, the sensors 31 detect that the key top 4** has been depressed by the player.

The second projecting part 56 is a cylindrical member provided in a position opposite the cylindrical member 25 of the base 2, and projects downward from the bottom surface of the top wall 51. When the key top 4 is depressed by the player, the second projecting part 56 is inserted into the cylindrical member 25. The rubber 71 provided within the cylindrical member 25 is pressurized and elastically deforms as a result. A clicking sensation can be provided to the player as a result.

Eight cutouts 57 are formed in a bottom end of the side wall 52. The eight cutouts 57 are formed in positions facing outward from corresponding ones of the LEDs 32 mounted on the PCB 3.

The bezel 6 is a cover member for covering (protecting) part of the top surface and the side surfaces of the pushbutton 1. The bezel 6 includes a top surface cover member 61 and a side surface cover member (protective member) 62.

The top surface cover member 61 is a member that covers part of the top surface of the pushbutton 1 (the top surface of the light guide part 50 of the key top 4 and part of the base 2). An opening is provided in the central part of the top surface cover member 61. Accordingly, the display part 40 of the key top 4 projects upward from the bezel 6 through the stated opening, and is fitted with play such that the key top 4 can be pressed downward.

The side-surface cover member 62 is a member for covering the side surface of the pushbutton 1. A top end of the side-surface cover member 62 is continuous with the top surface cover member 61, and a bottom end of the side-surface cover member 62 makes contact with the base 2. The side-surface cover member 62 is formed from a translucent, milky-white material. By forming the side-surface cover member 62 from a translucent material, the side-surface cover member 62 transmits some of the emitted light while reflecting some of the emitted light. The side-surface cover member 62 acts as a dispersing material, and disperses the light emitted onto the side-surface cover member 62. The entire side-surface cover member 62 can therefore be illuminated, and the some of the light reflected by the side-surface cover member 62 can enter into the side wall 52 of the light guide part 50.

Four lock receiving parts 63 that interlock with corresponding ones of the locking parts 27 of the base 2 are formed in the bottom end of the side-surface cover member 62. The side-surface cover member 62 is fixed to the base 2 by the lock receiving parts 63 interlocking with the locking parts 27.

Light Guide Path for Light Emitted from LEDs 32

A light guide path for the light emitted from the LEDs 32 will be described with reference to FIGS. 7 and 8.

Figure 7:
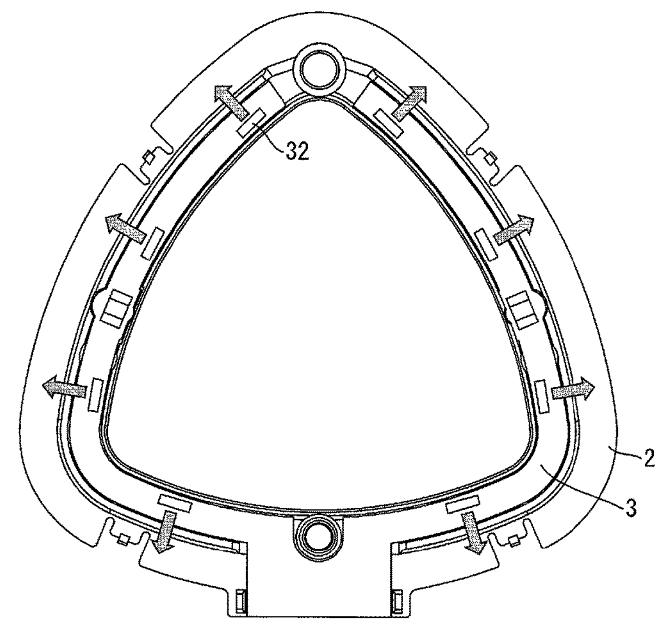
FIG. 7 is a top view illustrating emission directions of light emitted from LEDs included in a pushbutton.

FIG. 7 is a top view illustrating emission directions of light emitted from the LEDs 32. Note that FIG. 7 illustrates only the base 2 and the PCB 3. FIG. 8 is a cross-sectional view illustrating an example of the light guide path of light emitted from the LEDs 32.

Figure 8:
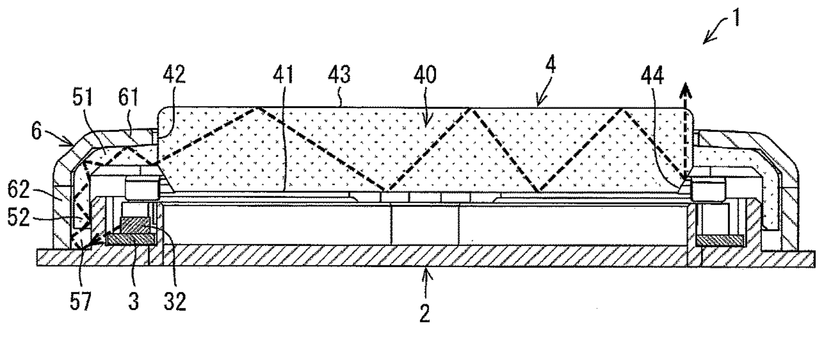
FIG. 8 is a cross-sectional view illustrating an example of a light guide path of light emitted from LEDs.

As illustrated in FIGS. 7 and 8, in the pushbutton 1, the light emitted from the LEDs 32 is emitted outward (that is, toward the side-surface cover member 62 of the bezel 6). More specifically, the light emitted from the LEDs 32 passes through the outer wall 22 of the light-transmissive base 2, toward the cutouts 57 provided in the side wall 52 of the light guide part 50 of the key top 4.

The light emitted toward the cutouts 57 reaches the side-surface cover member 62 of the bezel 6. Some of the light that has reached the side-surface cover member 62 passes through the side-surface cover member 62. The side-surface cover member 62 can therefore be illuminated.

Meanwhile, some of the light that has reached the side-surface cover member 62 is reflected by the side-surface cover member 62. Some of the light reflected by the side-surface cover member 62 enters into the side wall 52, and is guided by being fully reflected within the light guide part 50 (in other words, by the side wall 52 and the top wall 51), as illustrated in FIG. 8. The light guided within the light guide part 50 enters the display part 40 from the side surface 42 and irradiates the display part 40. The light entering the display part 40 is guided by being fully reflected between the bottom surface 41 and the top surface 43, and some of that light is reflected upward by the sloped surface 44. The light reflected upward by the sloped surface 44 is emitted to the exterior from the top surface 43. The outer edge of the display part 40 can therefore be illuminated.

As described above, the side-surface cover member 62 is a dispersing material, and thus the light reflected by the side-surface cover member 62 is reflected in various directions. Accordingly, some of the reflected light can be caused to enter into the side wall 52 of the light guide part 50. Although the side-surface cover member 62 is a dispersing material and the light reflected by the side-surface cover member 62 is dispersed in the present embodiment, the game machine pushbutton according to one or more embodiments is not limited to such a configuration. In other words, in the game machine pushbutton according to the one or more embodiments, the side-surface cover member may have any configuration as long as the light reflected by the side-surface cover member can be dispersed. For example, the configuration may be such that the side-surface cover member is formed from a transparent material whose surface has been given a milky-white coating that disperses the light reflected by the side-surface cover member.

Features of Pushbutton 1

As described above, the pushbutton 1 includes the key top 4, including the light-transmissive display part 40, the key top 4 being depressed by a player, and the LEDs 32 that emit light toward the display part 40. The display part 40 includes the bottom surface 41 and the sloped surface 44, the sloped surface 44 being continuous with an outer edge of the bottom surface 41 and broadening outward as the sloped surface 44 progresses upward from the bottom surface 41. The light emitted from the LEDs 32 toward the display part 40 is reflected by the sloped surface 44 and emitted toward the exterior from the top surface 43.

Here, in the case where the display part does not include the sloped surface, an LCD image reflected by the side surface of the display part will be visible to the player. This is problematic in that the player will sense a distance between the LCD image and the display part, or in other words, will experience a sense of depth in the image.

However, the pushbutton 1 has the configuration described above, that is, the display part 40 includes the sloped surface 44. This makes it possible to suppress a situation in which an image from the LCD 100 is reflected by the side surface 42, and reduce a sense of the depth in the image from the LCD 100 on the part of the player.

Furthermore, the light emitted toward the display part 40 from the LEDs 32 is reflected by the sloped surface 44 and emitted to the exterior from the top surface 43 of the display part 40, and thus the outer edge of the display part 40 can be illuminated. The aesthetic effect can be enhanced as a result. Furthermore, by illuminating the outer edge of the display part 40, the image from the LCD 100 can be displayed sharply. This makes it possible to further suppress a situation in which the player feels a sense of distance between the image from the LCD 100 and the display part 40, and further reduce a sense of the depth in the image from the LCD 100 on the part of the player.

Additionally, in the pushbutton 1, the light emitted from the LEDs 32 enters the display part 40 from the side surface 42, and thus the percentage of light fully reflected by the bottom surface 41 and the top surface 43 can be increased. As a result, a situation in which light escapes from locations aside from the outer edge of the display part 40 (on other words, the top side of the sloped surface 44) can be suppressed.

Additionally, according to the pushbutton 1, the light emitted from the LEDs 32 enters the display part 40 from the side surface 42 via the light guide part 50. The directions in which the light enters the display part 40 can therefore be narrowed down. As a result, the percentage of the light fully reflected by the bottom surface 41 and the top surface 43 can be further increased, which makes it possible to further suppress a situation in which light escapes from locations aside from the outer edge of the display part 40.

Additionally, according to the pushbutton 1, the LEDs 32 emit light toward the side-surface cover member 62. The side-surface cover member 62 allows some of the light emitted from the LEDs 32 to pass. The side-surface cover member 62 can therefore be illuminated, which enhances the aesthetic effect. Additionally, the side-surface cover member 62 reflects some of the emitted light. Accordingly, some of the light reflected by the side-surface cover member 62 enters the light guide part 50, is guided by the light guide part 50 to the display part 40, and illuminates the outer edge of the display part 40. Both the outer edge of the display part 40 and the side-surface cover member 62 can therefore be illuminated by the same LEDs 32.

Additionally, according to the pushbutton 1, the side-surface cover member 62 is configured to disperse the emitted light. As a result, the entire side-surface cover member 62 can be illuminated, and some of the reflected light can be caused to enter the light guide part 50.

The present invention is not limited to the above-described embodiment, and various modifications can be made thereon within the scope laid out in the claims. Embodiments achieved by combining the technical means disclosed in different embodiments as appropriate also fall within the technical scope of the present invention.

The invention claimed is:

1. A game machine pushbutton installed in a game machine, the pushbutton comprising:

an operating key, including a light-transmissive first member, the operating key configured to be depressed; and a light-emitting unit configured to emit light, wherein the first member includes a top surface, a bottom surface opposing the top surface, a side surface orthogonal to the top surface and the bottom surface, and a sloped surface provided at a corner of the bottom surface and the side surface, the sloped surface connecting an outer edge of the bottom surface and a lower edge of the side surface, and extending outward as the sloped surface progresses upward from the bottom surface, the light-emitting unit is provided in an area not overlapping with the first member in a direction orthogonal to the top and bottom surfaces of the first member, and the light emitted from the light-emitting unit enters the first member from the side surface of the first member, is reflected by the sloped surface, and emitted toward an exterior from the top surface of the first member.

2. The game machine pushbutton according to claim 1, wherein the operating key includes a second member including a first end provided in vicinity of the light-emitting unit and a second end in contact with the side surface such that the light emitted from the light-emitting unit enters from the first end into the second member and exits the second member from the second end such that the light exiting from the second end of the second member enters into the first member through the side surface of the first member.

3. The game machine pushbutton according to claim 2, further comprising:

a protective member configured to protect a side surface of the game machine pushbutton, wherein the light-emitting unit emits light toward the protective member;

the protective member is configured to allow some of the light emitted from the light-emitting unit to pass and reflect some of the emitted light; and some of the light reflected by the protective member enters the second member, is guided by the second member, and enters the first member.

4. The game machine pushbutton according to claim 3, wherein the protective member is configured to disperse the emitted light.

5. The game machine pushbutton according to claim 2, further comprising:

a protective member covering a lower portion of the side surface, the second member, and the light-emitting unit and including an opening exposing the top surface of the first member, and the second member is provided along an inner surface of the protective member.

6. The game machine pushbutton according to claim 5, wherein the protective member reflects a part of the emitted light to make the reflected part of the emitted light to enter the second member.

* * * * *